Jan. 6, 1931.  R. L. HIBBARD  1,788,193
MACHINE TOOL
Filed May 17, 1928  15 Sheets-Sheet 2

INVENTOR
Robert L. Hibbard
by
James E. Bradley
atty

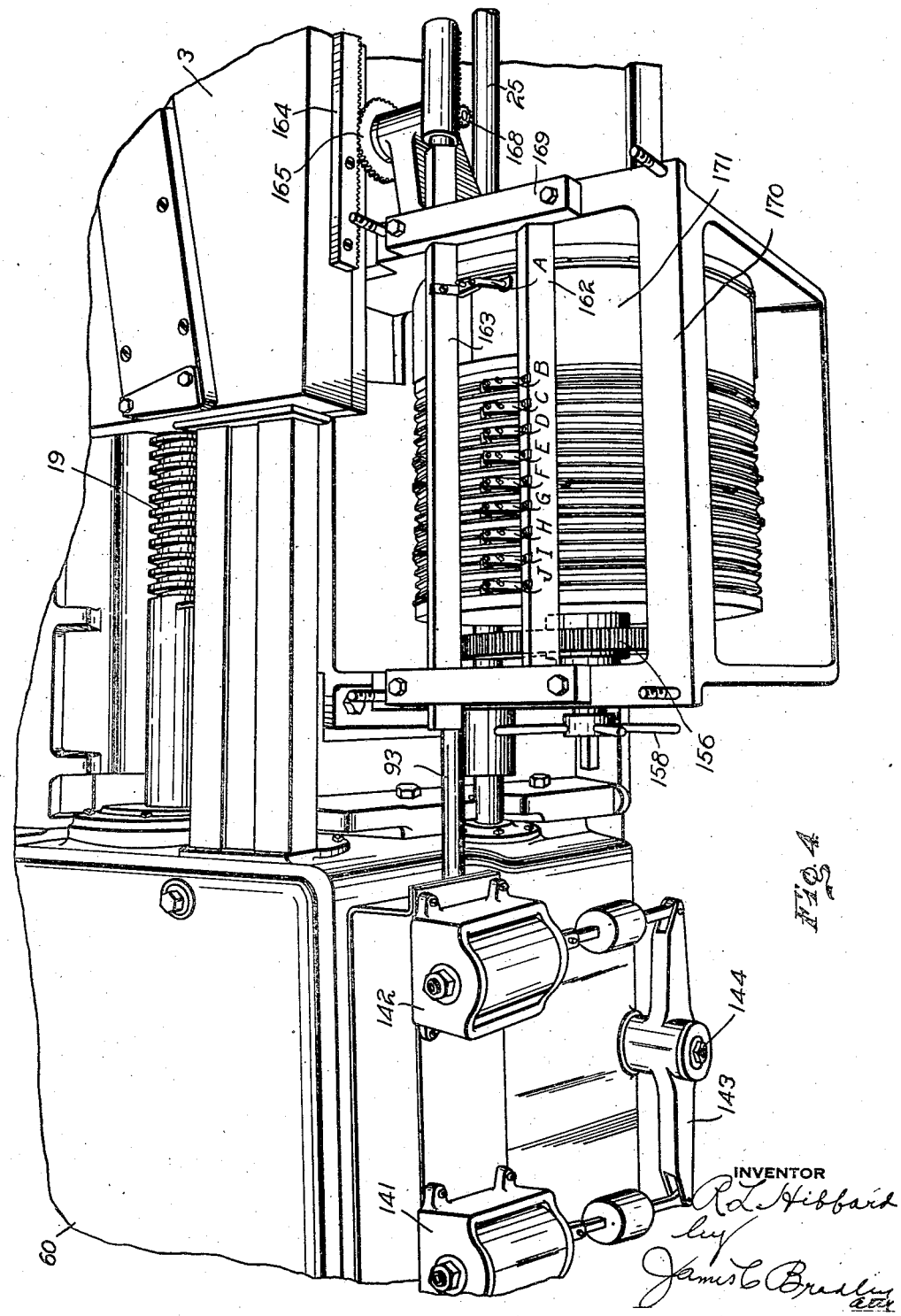

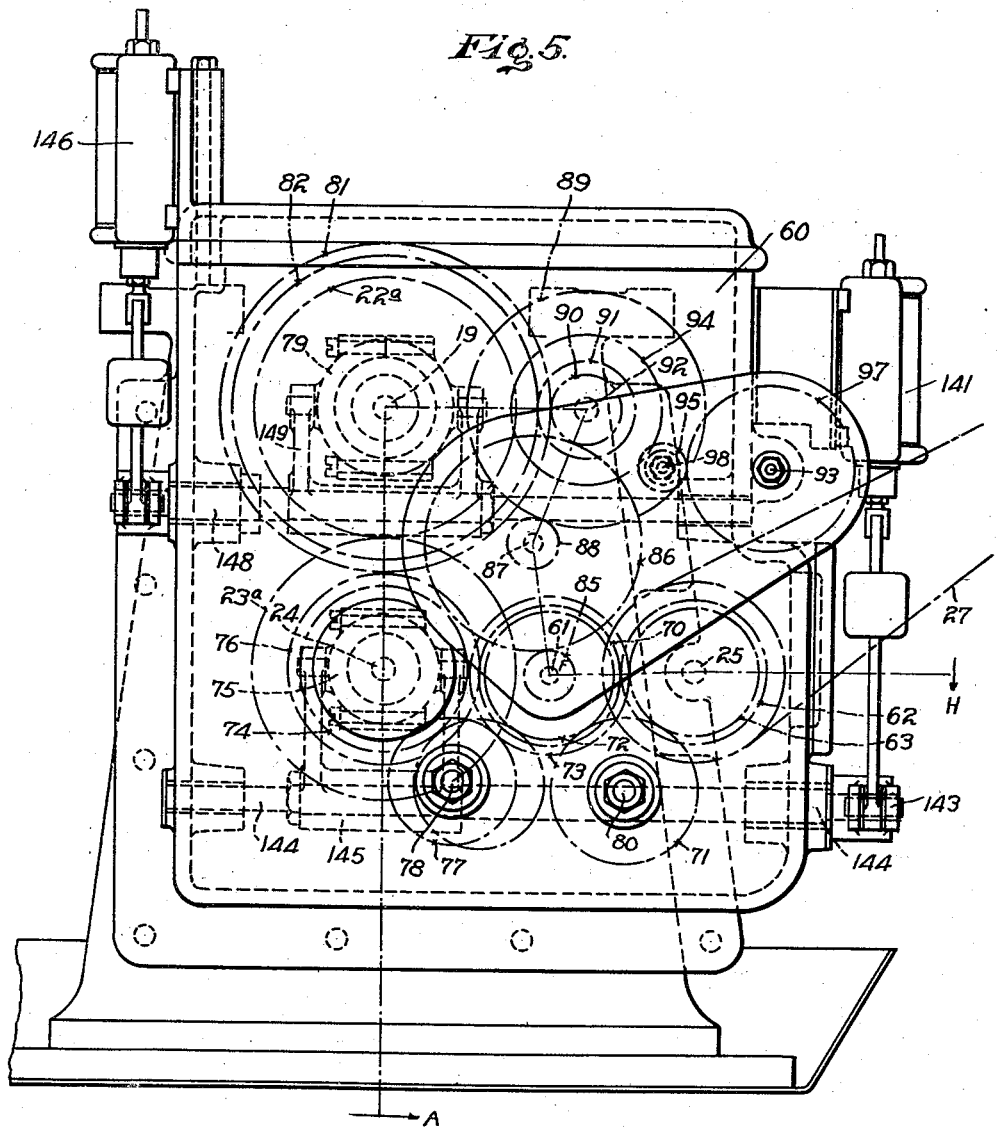

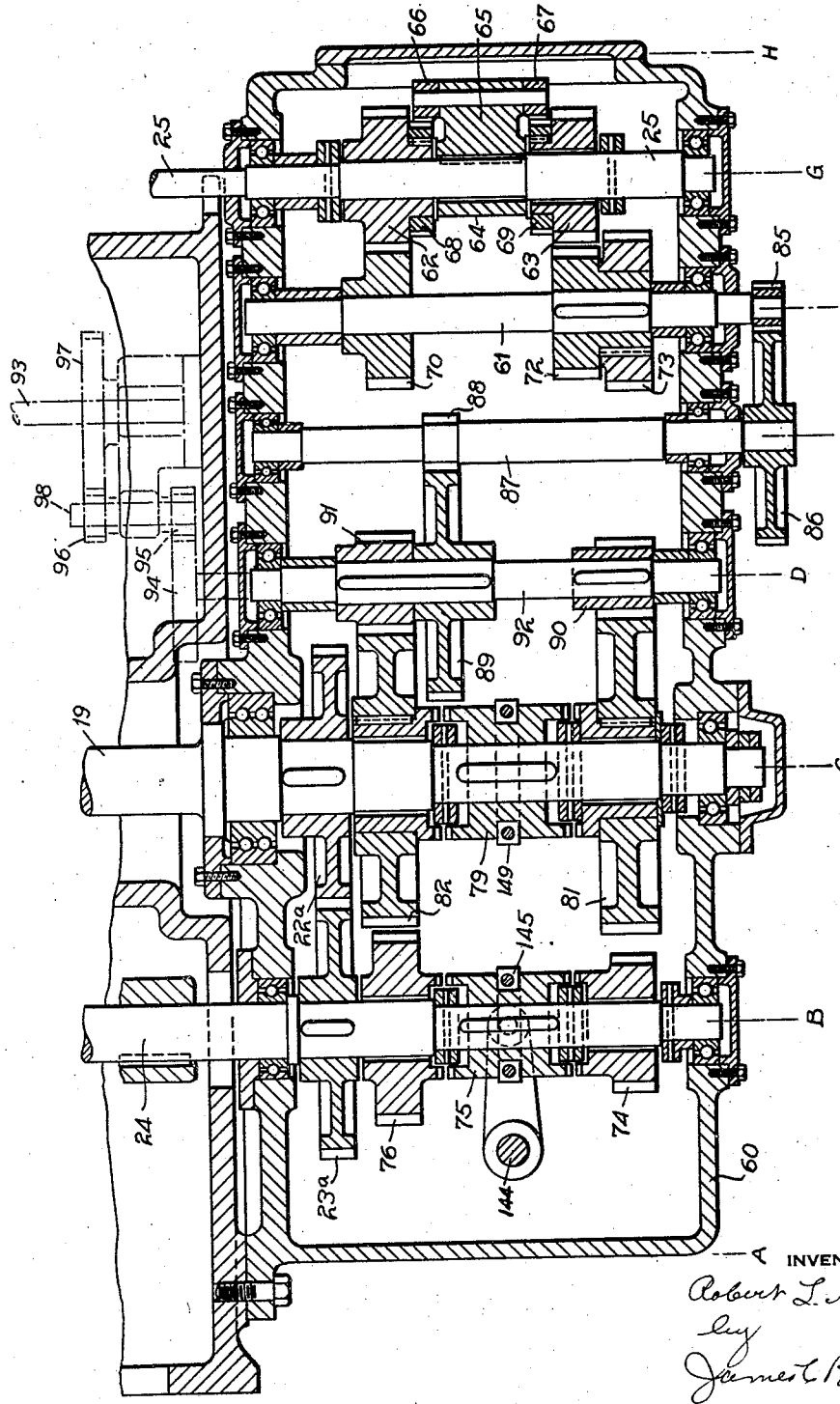

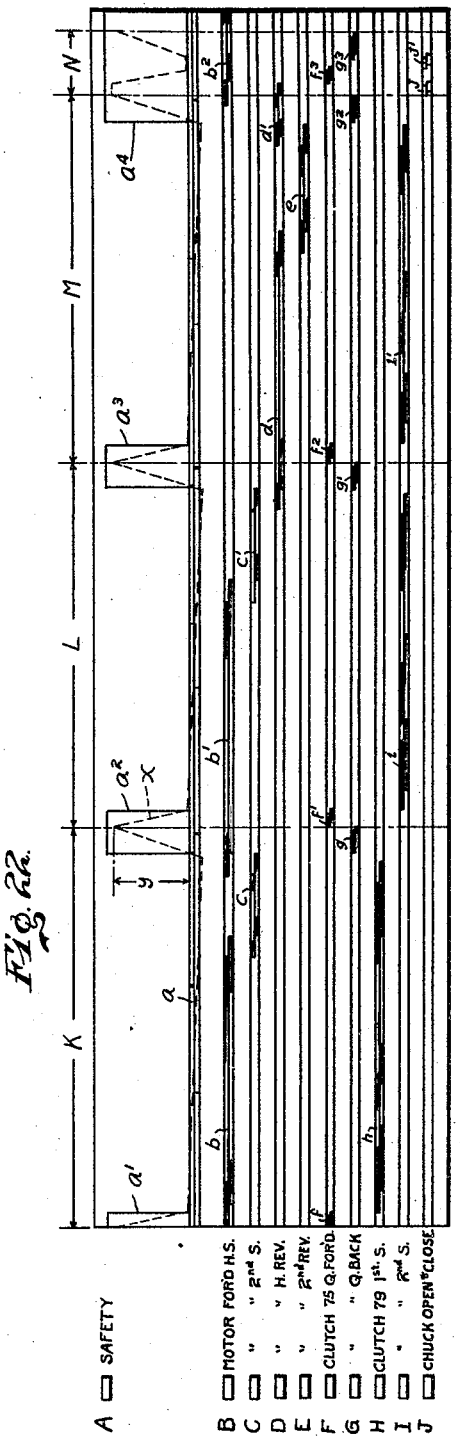
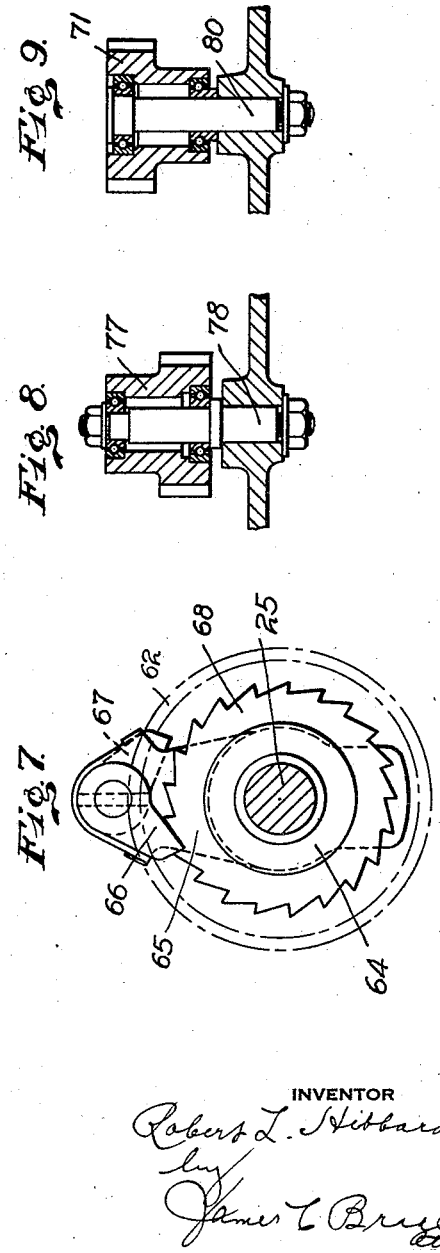

Jan. 6, 1931.  R. L. HIBBARD  1,788,193
MACHINE TOOL
Filed May 17, 1928   15 Sheets-Sheet 7

INVENTOR
Robert L. Hibbard
by
James C. Bradley
atty

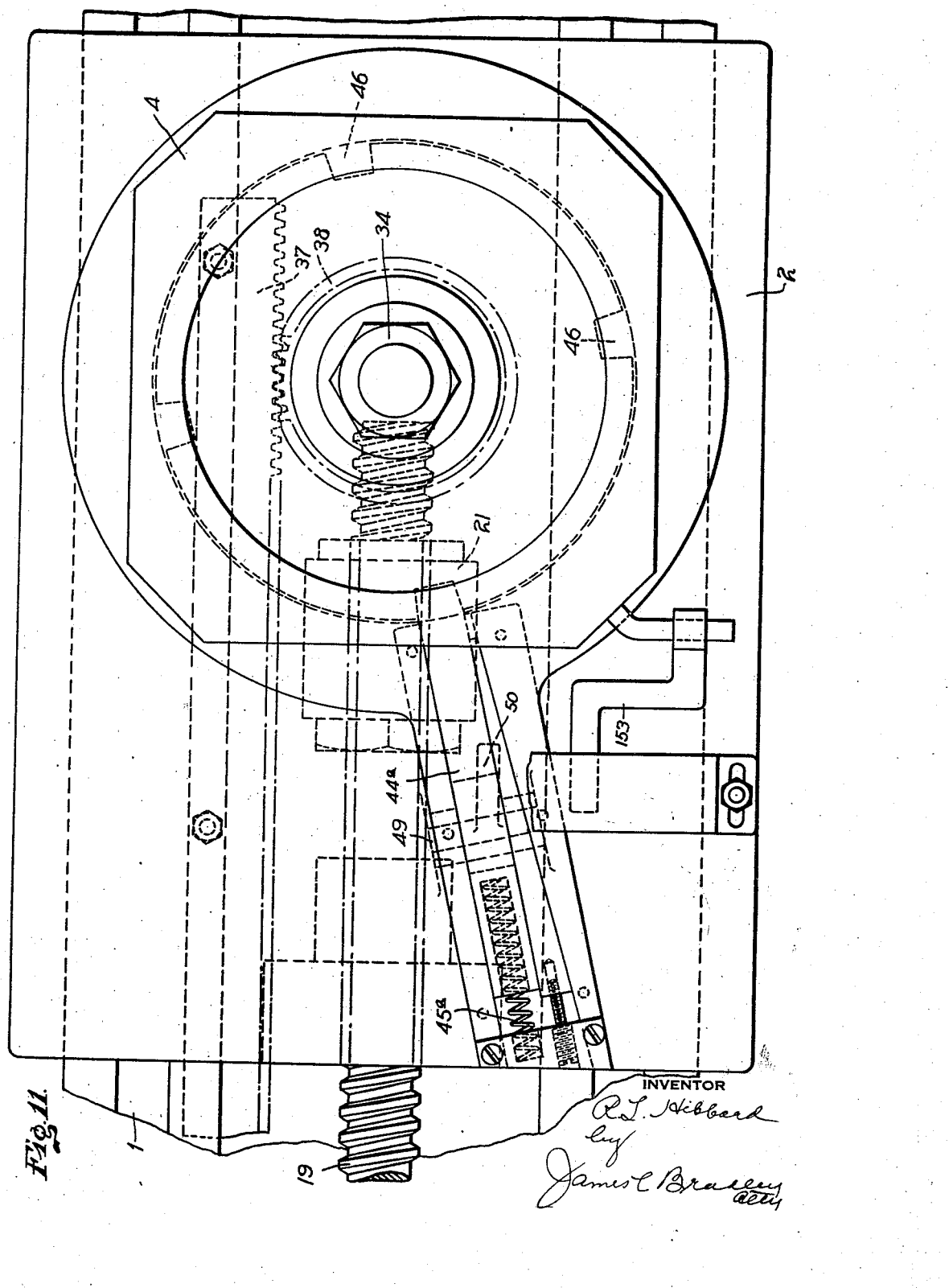

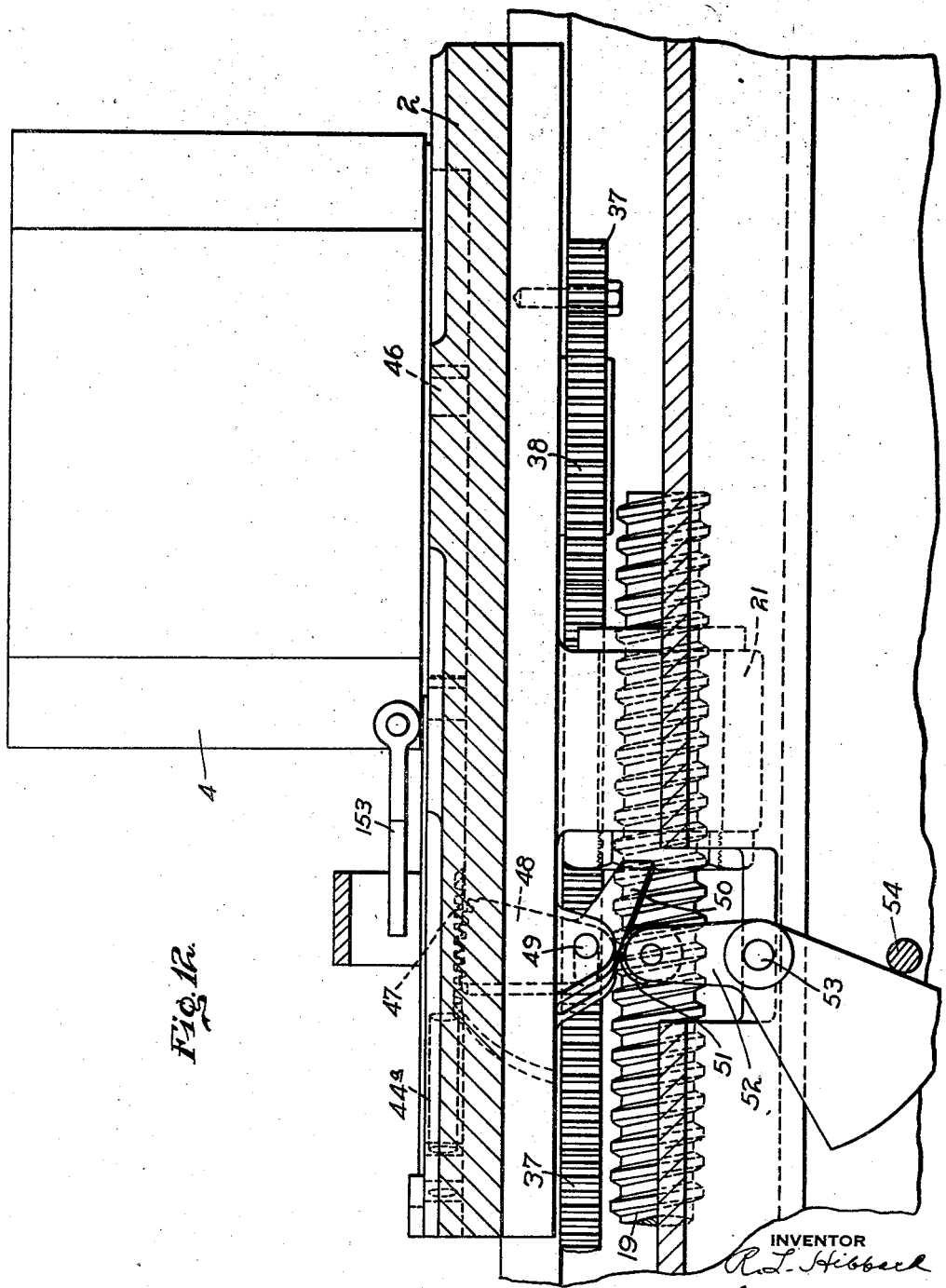

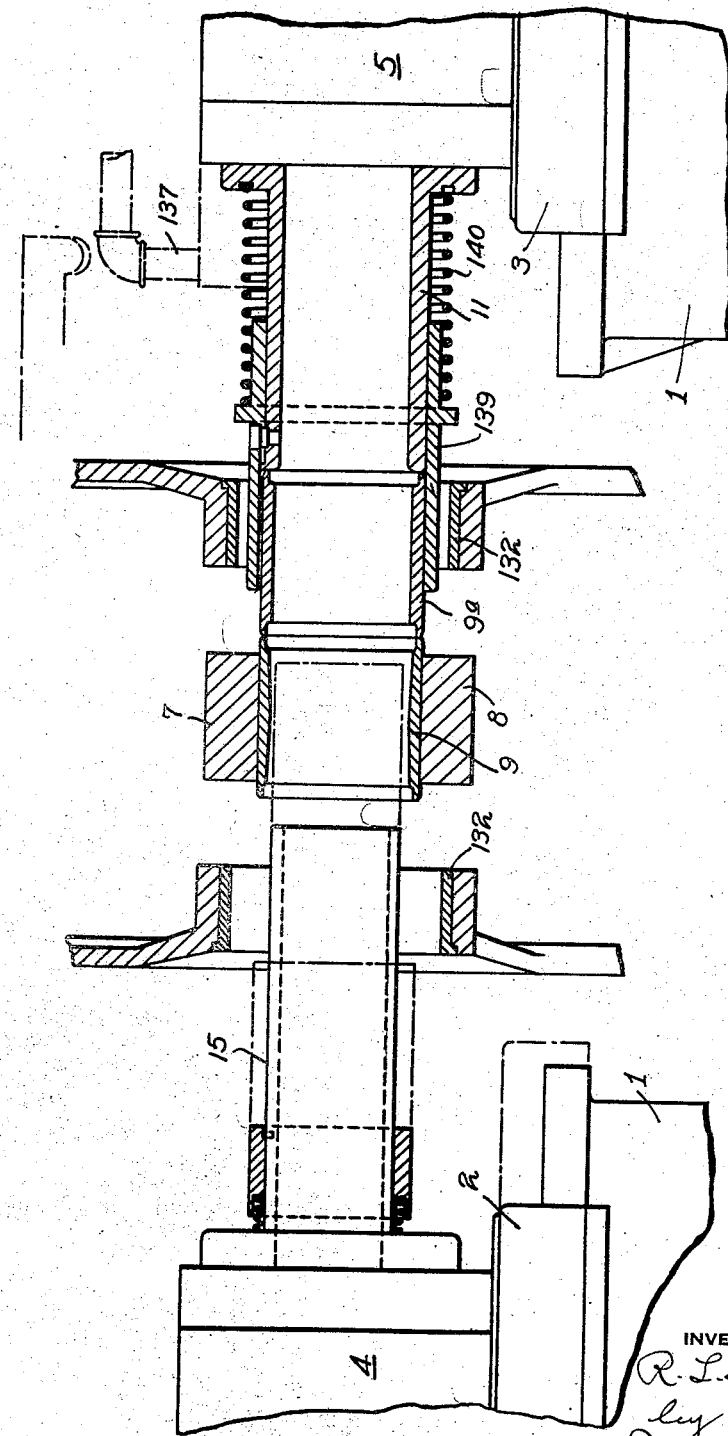

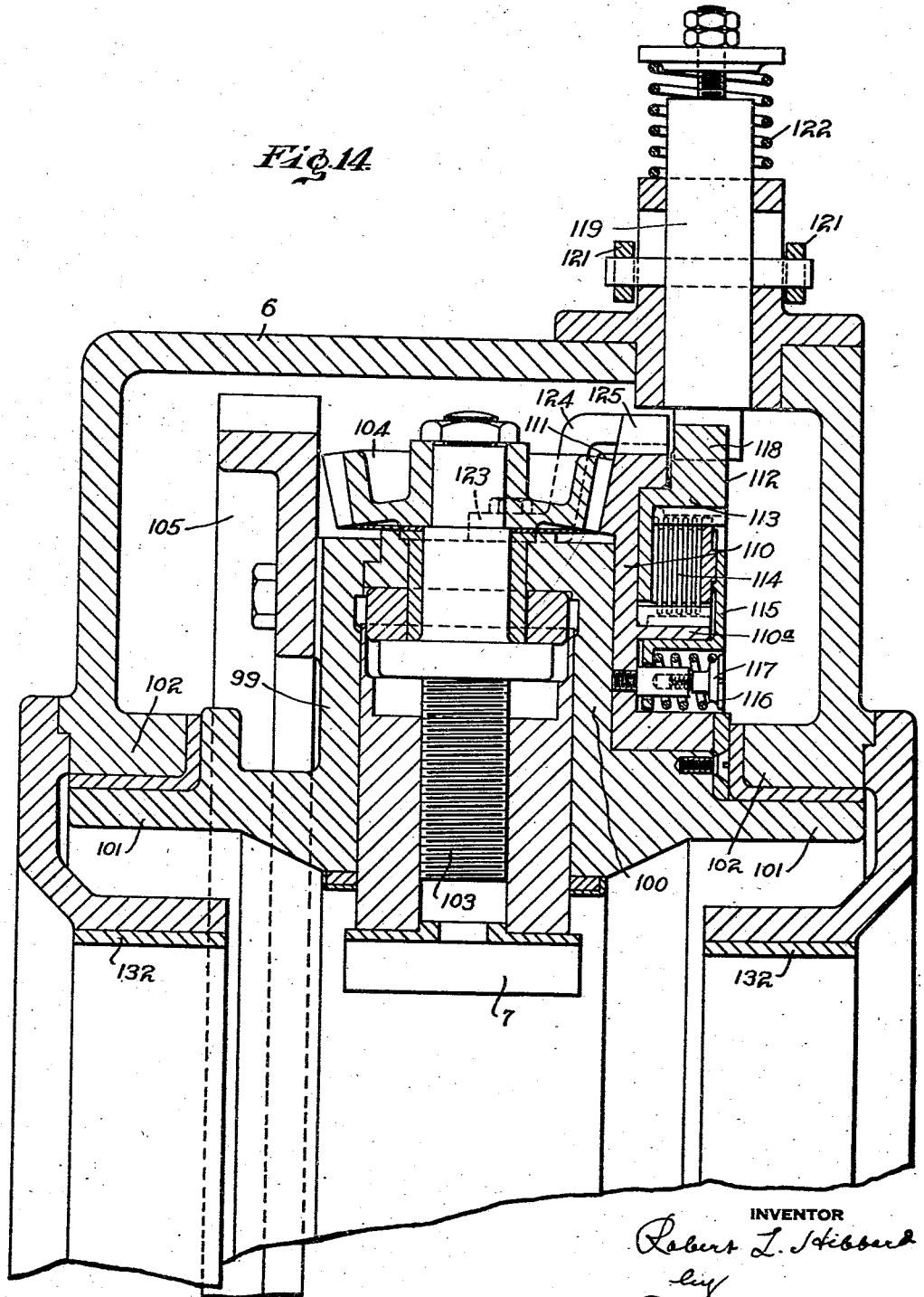

Jan. 6, 1931.  R. L. HIBBARD  1,788,193
MACHINE TOOL
Filed May 17, 1928   15 Sheets-Sheet 12

Inventor
R. L. Hibbard
by
James L. Bradley
atty

Jan. 6, 1931.                R. L. HIBBARD                1,788,193
                              MACHINE TOOL
                          Filed May 17, 1928          15 Sheets-Sheet 13
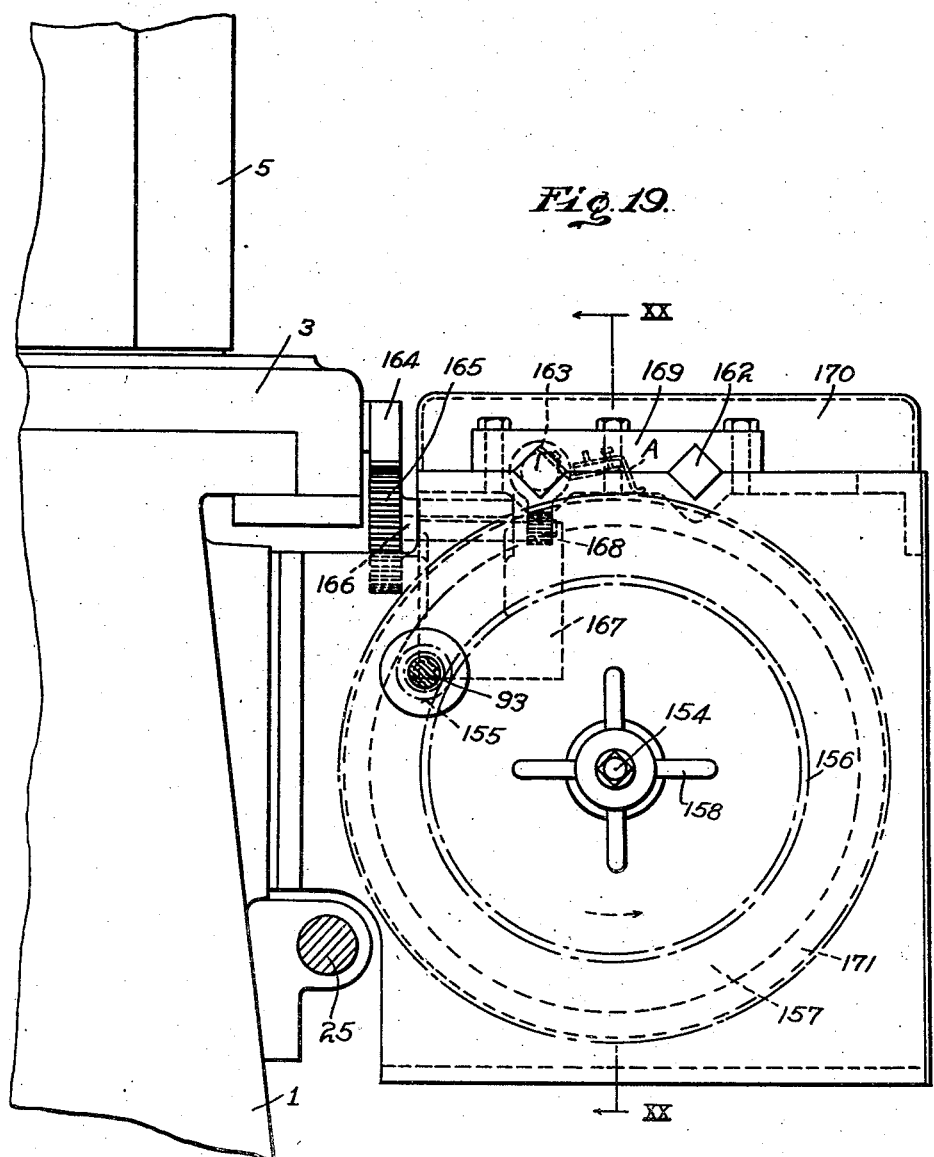
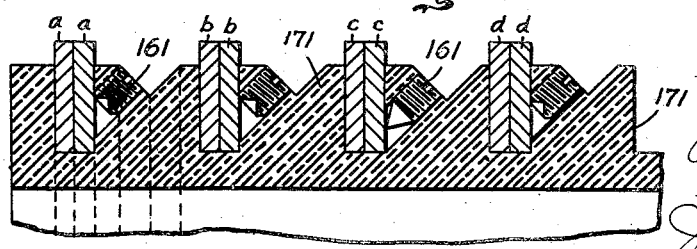
INVENTOR
Robert L Hibbard
by
James L Bradley
atty Jan. 6, 1931.   R. L. HIBBARD   1,788,193
MACHINE TOOL
Filed May 17, 1928   15 Sheets-Sheet 14
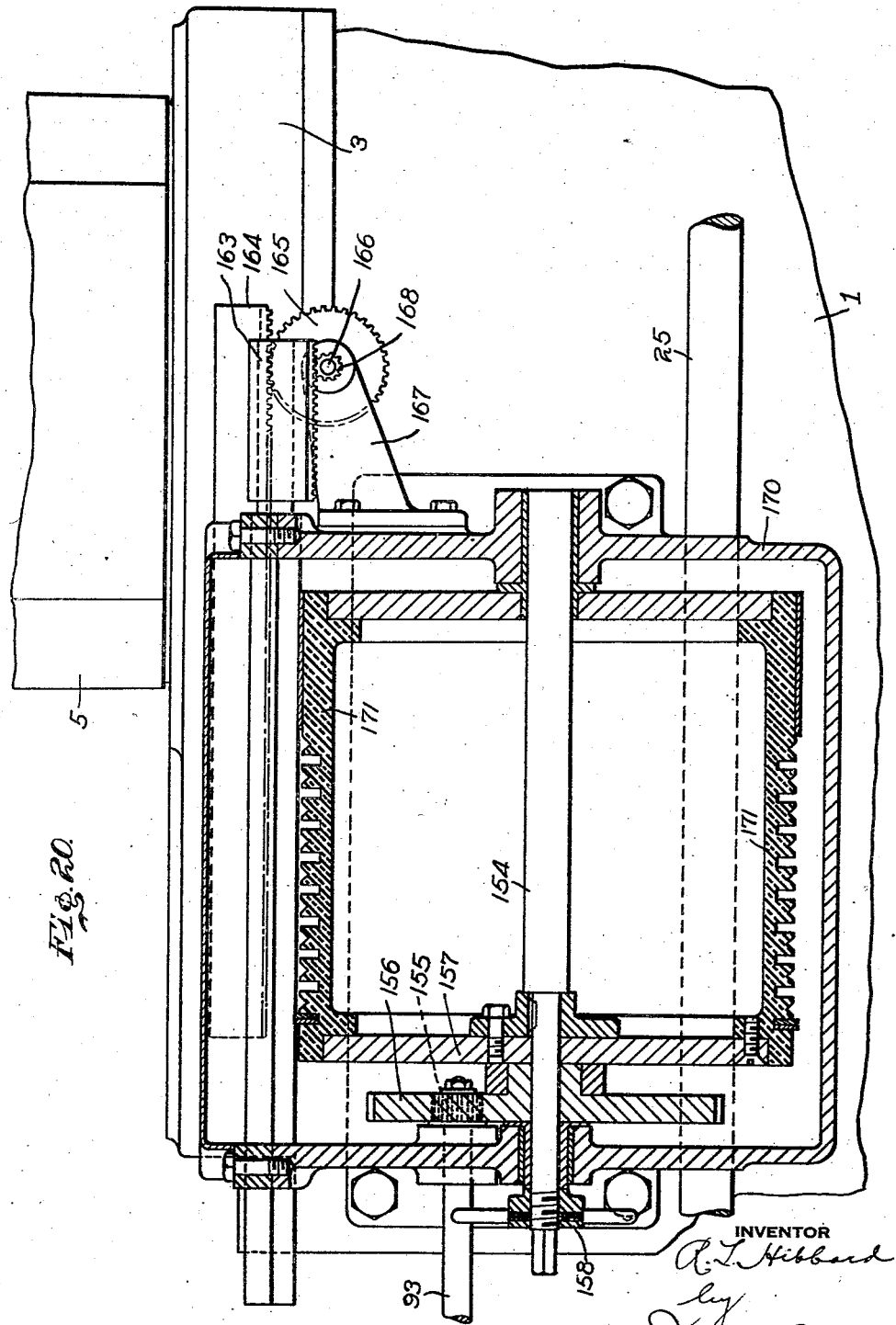
INVENTOR
R. L. Hibbard
by
James E. Bradley
atty

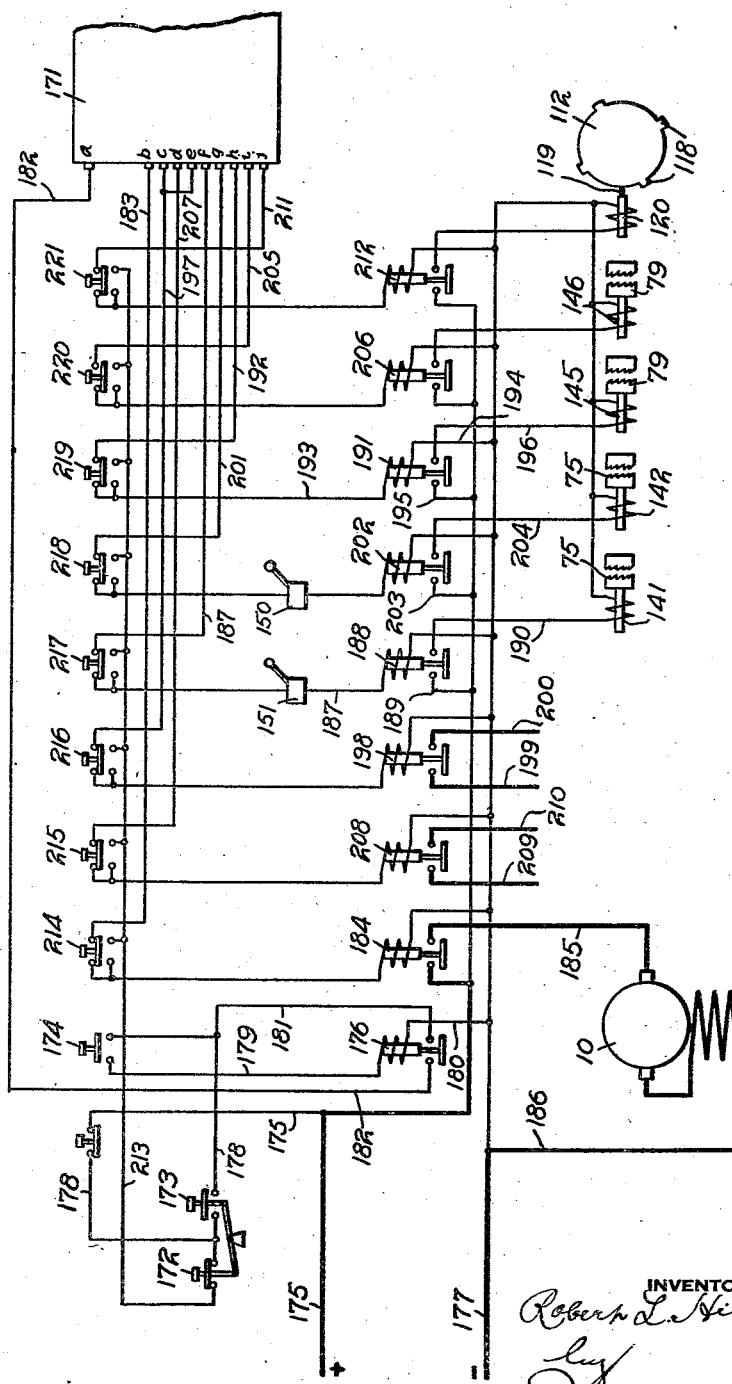

Patented Jan. 6, 1931

1,788,193

UNITED STATES PATENT OFFICE

ROBERT L. HIBBARD, OF BELLEVUE, PENNSYLVANIA, ASSIGNOR OF ONE-HALF TO WILLIAM K. STAMETS, OF PITTSBURGH, PENNSYLVANIA

MACHINE TOOL

Application filed May 17, 1928. Serial No. 278,560.

Figure 1:
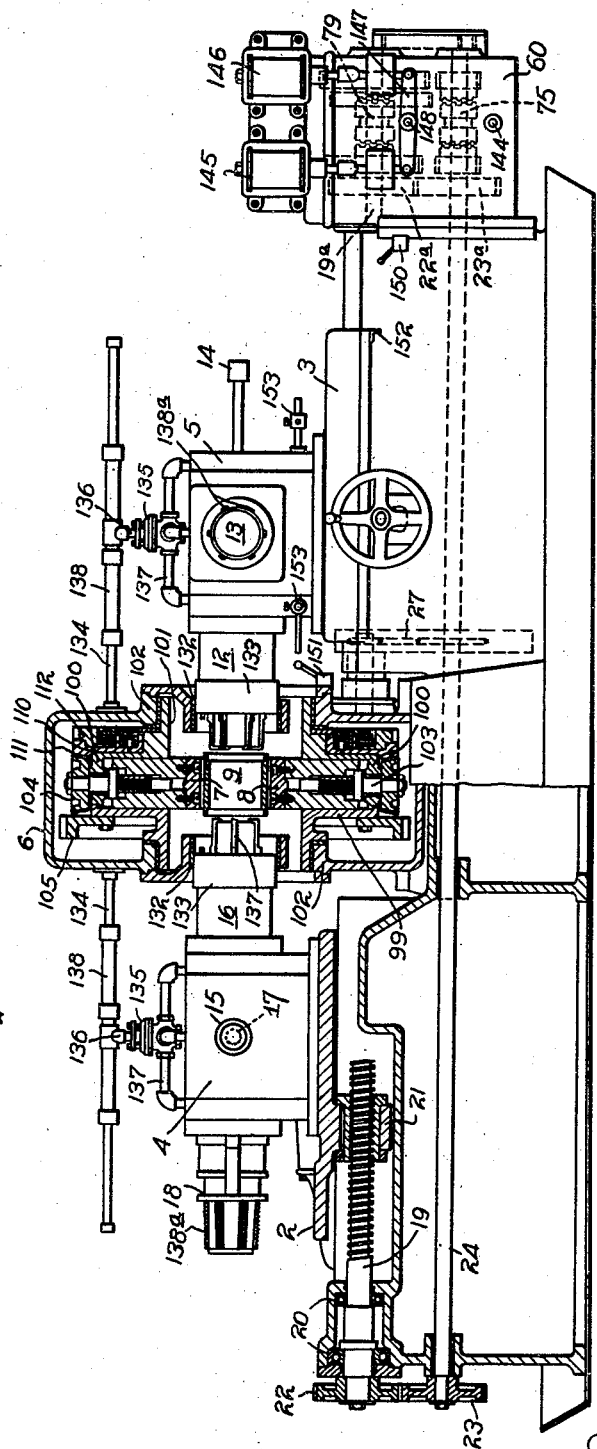
Figure 2:
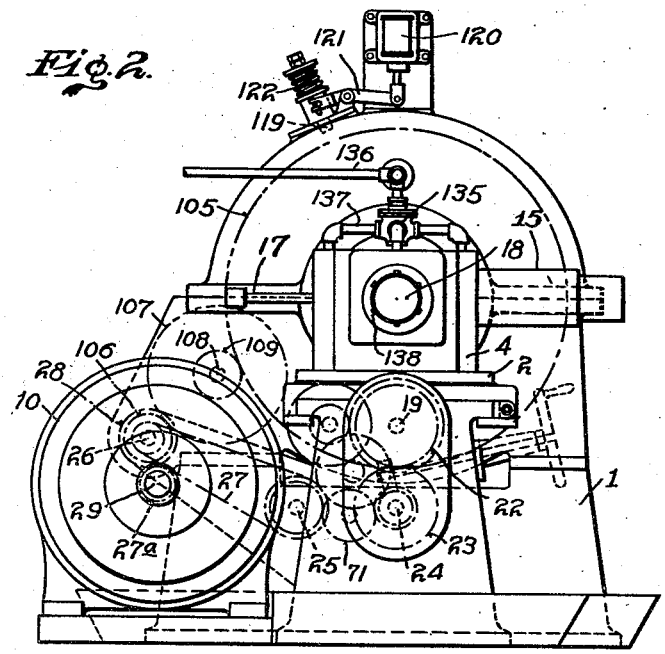
Figure 3:
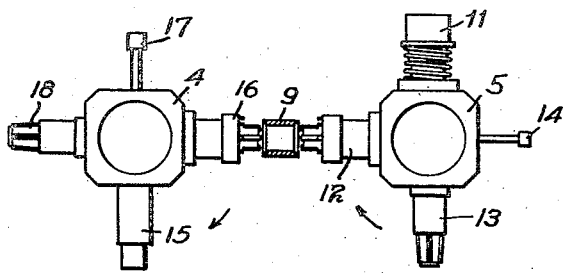
Figure 10:
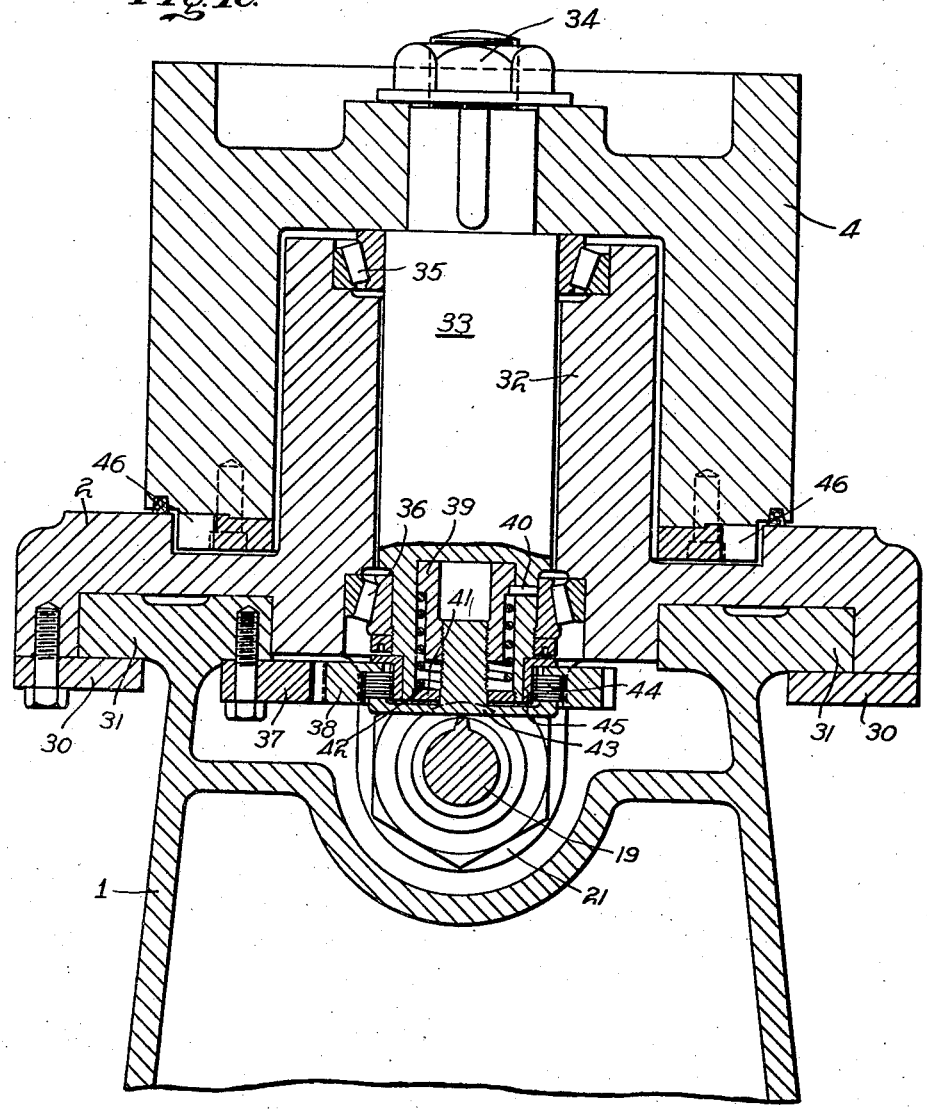

The invention relates to machine tools, and more particularly to automatic machines for reaming and tapping couplings, although certain features of the invention are of broader application. The primary objects of the invention are the provision of a machine of the kind specified (1) which will do more accurate work than the machines heretofore commonly employed, (2) which can be operated at a relatively low labor cost as compared with existing machines due to the fact that substantially the only hand work required is the application and removal of the couplings; and the provision of a machine of relatively simple construction costing only a fraction of the amount required to construct the machines now employed to machine the same number of couplings per unit of time. One embodiment of the invention is illustrated in the accompanying drawings, wherein:

Figure 1 is a partial side elevation and partial longitudinal section through the machine. Fig. 2 is an end elevation. Fig. 3 is a diagrammatic plan view showing the relation of the two turrets and the tools carried thereby. Fig. 4 is a perspective view showing the drum on the rear side of the machine. Fig. 5 is an end elevation of the gear box. Fig. 6 is a horizontal section through the gear box, but with the gearing developed or moved out of its true position in order to better show the relation of the parts. Figs. 7, 8 and 9 are detail views of certain of the gear parts not clearly shown in Figs. 5 and 6. Figs. 10, 11 and 12 are detail views of one of the turrets, Fig. 10 being a vertical section, Fig. 11 a plan view and Fig. 12 a side elevation. Fig. 13 is a section through the turret arm for applying and removing the couplings. Fig. 14 is a vertical section through the clutch mechanism. Figs. 15 to 18 are detail elevation views showing certain parts of the chuck mechanism. Figs. 19, 20 and 21 are detail views of the switch drum, Fig. 19 being an end view, Fig. 20 a vertical section on the line XX—XX of Fig. 19, and Fig. 21 a fragmentary section through the periphery in a plane at right angles to that of Fig. 21. Fig. 22 is a diagrammatic developed view of the switch drum. And Fig. 23 is a diagrammatic view of the switch drum wiring and cooperating parts.

Referring to the drawings, 1 is the frame of the machine; 2 and 3 are carriages mounted for movement back and forth on suitable guideways on the frame upon which are mounted the turrets 4 and 5; 6 is the casing for the chuck, which chuck comprises a pair of jaws 7 and 8 for gripping the couplings 9; and 10 is an electric motor for rotating the chuck and for giving the carriages their back and forth movements.

Each turret has four arms provided with tools or other means adapted to act upon or cooperate with the couplings. The turret 5 has an arm 11 (Fig. 3) for placing the couplings in the chuck, an arm 12 provided with a reamer, an arm 13 provided with a tap for threading one end of the coupling, and an arm 14, which carries no machine tool, but which might be used to carry a tool in case an additional machine operation were required on the coupling. The turret 4 has an arm 15 for receiving the finished coupling from the chuck as a new one is shoved into place by the arm 11, an arm 16 provided with a reamer, an arm 17 corresponding to the arm 14 and carrying no machine tool, and the arm 18 provided with a tap for threading the left hand end of the coupling.

In operation, the carriages move back and forth and their turrets are rotated to position the arms as the carriages approach the rear ends of their strokes. Starting with the parts in the positions shown in Figs. 1 and 3, the operation is as follows: The coupling 9 is rotated by the chuck and the carriages advance, so that the reamers on the arms 12 and 16 move into the coupling and true up its interior preparatory to the threading operations, which are to follow. The carriages now move to the rear, and as they approach the rear extremes of their travel, the turrets are both caused to rotate in a clockwise direction through arcs of 90 degrees, thus bringing the tap arm 13 and dummy arm 17 into opposition and in alinement with the coupling. As the carriages now advance again the tap on the arm 13 threads the right hand end of the coupling, while the dummy arm 17 opposes the other end of the coupling. The tap is now collapsed, by the use of suitable stop means (not shown) operated by the forward movement of the carriage 5, and the backward movement of the carriages begins, the turrets being rotated through a further angle of 90 degrees at the rear ends of their strokes, thus bringing the tap arm on the turret 4 and the dummy arm 14 on the turret 5 into operative positions. As the turrets now advance toward the chuck, its direction of rotation is reversed, so that the tap on the arm 18 threads the left hand side of the coupling in the same direction as that already cut on the right hand side by the tap 13. On a further retraction of the carriages, the turrets are rotated, so as to bring the arms 11 and 15 into alinement with the chuck. As the carriage 3 advances, the operator places a new coupling to be machined on the arm 11. When the new coupling is about to engage the finished coupling 9, the jaws 7, 8 are released, so that the oncoming new coupling can push the finished one onto the receiving arm 15 of the turret 4. The jaws of the chuck now advance and grip the new coupling, while the carriages move back again, the finished coupling being carried by the arm 15, from which it is removed by the operator. The turrets are again rotated as the carriages move back, thus bringing the reamer arms 12 and 16 again into operative position, thus completing the cycle. The machine is entirely automatic in carrying out the foregoing operations, the only work of the operator, after starting the motor 10, being the positioning of the couplings upon the arm 11 of the turret 5 at the proper time and the removal of the finished couplings from the arm 15 of the turret 4. The means for carrying out the foregoing operations automatically will now be set forth.

The carriages 2 and 3 are moved back and forth by a pair of similar screw shafts 19, 19, swiveled at their outer ends in a pair of bearings 20, 20 and engaging at their inner ends nuts 21, 21. The shafts have keyed to their ends the gears 22, 22a driven from the gears 23, 23a carried by the countershaft 24 extending the length of the machine. Only one shaft 19 and nut 21 are shown, but it will be understood that a similar arrangement is provided for the carriage 3. The shaft 24 is driven from the shaft 25 through the intermediary of the gearing in the gear box 60 of Figs. 5 and 6, as fully described later. The shaft 25 is driven from a countershaft 26 through the intermediary of a pair of sprockets on the shafts and the chain 27 (Fig. 2) and the countershaft 26 is driven from the motor 10 through the intermediary of a pair of intermeshing spur gears 27a and 28 on the motor shaft 29 and countershaft 26, respectively.

The turrets 4 and 5 are rotated and indexed by the backward movements of the carriages, the construction in each case being the same, so that only one, that of the turret 4, as shown in Figs. 10, 11 and 12, will be described. The carriage 2 has plates 30 lying beneath the flanges 31 of the frame 1, and has a central pillar 32 around which the turret casing 4 fits. The turret has a post 33 secured to the casing 3 by the nut 34 with roller bearings 35 and 36 between the post and pillar. A rack 37 is bolted to the machine frame, and has in engagement therewith the spur gear 38 secured by a friction clutch to the post 33 of the turret, so that the back and forth movements of the carriage tend to cause a rotation of the turret, such rotation being prevented during a part of the travel of the carriage by the indexing mechanism, later described. The lower end of the post 33 is bored out and in the recess fits the sleeve 39 held against rotary movement by the pin 40. The recess is closed by the disc 41 screwed into position, which disc acts as a support for the spring 42. The sleeve has threaded into its end the stem of the member 43, which presses upward on the friction discs 44. A part of these discs interlock with the gear 38, while another part interlocks with a ring 45, keyed to the lower end of the post 33. A yielding slip connection is thus provided which is brought into play when the shell of the turret is locked against movement by the indexing mechanism now to be described.

The index pin or rod 44$^a$ is slidably mounted on the turret carriage 2 and yieldingly pressed to the right (Fig. 11) by the spring 45$^a$. This pin is adapted to engage one of the sockets 46, 46, etc. when the turret is in one of its four operative positions heretofore referred to. The pin has on its lower side a rack 47 (Fig. 12) engaged by the segmental gear 48 pivoted at 49 and provided with the arm 50. As the carriage reaches the rear end of its travel, the arm 50 is engaged by a roller 51 of the counterbalanced stop member 52 pivoted to the frame 1 at 53. This member is held from swinging in a counterclockwise direction by the pin 54, so that as the carriage continues its movement to the left the gear 48, and with it the index pin 44a, is moved to the left, thus releasing the turret, which now revolves to a new position as the carriage continues its movement to the left, the index pin engaging another socket 46 after the turret has rotated through an arc of 90 degrees. The movement of the pin to the right to engage another socket 46 is caused by the spring 45a, the arm 50 having at this time passed the roller 51 of the stop member. On the reverse movement of the carriage 2 to the right to bring the turret tool into engagement with the coupling in the chuck, the stop member 52 offers no operating resistance to the arm 50 since its lower end is free to swing to the left. The index pin thus holds the turret against rotation as the carriage and turret advances to working position and is retracted again when the carriage moves to the left, the indexing device again coming into play as the turret approaches the rear end of its stroke.

The gearing in the gear box 60 at the right hand end of the machine is shown in Figs. 5 and 6. This gearing lies between the countershaft 25 (Figs. 1 and 2) heretofore referred to and the shaft 24 which drives the carriage moving screw shafts 19, 19. This gearing includes (1) means for reversing the direction of rotation of the shafts 19, 19 to move the carriages 2 and 3 simultaneously toward and from the chuck including a clutch, operated by a pair of solenoids, (2) means for shifting the forward and back speed of the carriages, so that they may advance and retreat rapidly when the tools are not working and advance slowly when the tools are working, such means including a clutch also operated by a pair of solenoids, and (3) means whereby the reversal of the motor in reversing the direction of rotation of the chuck as later described has no effect on the forward drive of the parts in the gear box and the switch or control drum later described.

Referring to Figs. 5 to 9, the drive from the shaft 25 to the shaft 24 includes means for maintaining the forward drive of the countershaft 61 lying in the train of gearing regardless of the reversal in the direction of rotation of the shaft 25, since a continuous forward drive is required in the machine and the drive motor 10 alternately runs backward and forward in order to give the chuck its two directions of rotation. Loose on the shaft 25 are the pinions 62 and 63 and keyed to the shaft is a sleeve 64 having an arm 65 (Fig. 7) on which are pivoted the pawls 66 and 67. These pawls engage the ratchets 68 and 69 keyed to the hubs of the gears 62 and 63 which ratchets face in opposite directions, so that when the shaft 25 is driven in one direction, the gear 62 is rotated, and when the shaft 25 is driven in the other direction, the gear 63 is driven. The gear 62 engages the gear 70 keyed to the shaft 61, while the gear 63 engages an idler pinion 71 on the shaft 80 (Figs. 5 and 9) which in turn engages the gear 72 keyed to the shaft 61. As a result, the shaft 61 is continuously driven in one direction regardless of the reversals of direction of the drive shaft 25.

The fast forward movement of the carriages 2 and 3 (driven by the screw shafts 19, 19) is provided by the train of gearing including the gear 70 on the shaft 61 meshing with the gear 76 (Fig. 5) on the shaft 24, the clutch 75 also on the shaft 24, and the gears 22a and 23a on the shafts 24 and 19, respectively. The clutch 75 is a reversing clutch splined on the shaft 24 and adapted to secure either the gear 76 in non-rotative relation with the shaft or the gear 74 in such relation. To secure the backward movement of the carriages, also at a relatively high speed, the clutch 75 is shifted, and the drive from the shaft 61 includes the gear 73 meshing with the idler gear 77 on the stub shaft 78 (Figs. 5 and 8) and the gear 76.

When the clutch 75 is in neutral position, two relatively slow forward feeds of the carriages may be secured by the use of the clutch 79 splined on the shaft 19 and adapted to engage the hub of either of the gears 81 or 82, loose on the shaft, the intermeshing gears 22a and 23a keyed to the shafts 19 and 24, and a train of reduction gearing interposed between the gears 81 and 82 and the drive shaft 61. This train of gearing comprises the pinion 85 on the end of the shaft 61, the gear 86 on the shaft 87, and the gears 88, 89, 90 and 91 on the shafts 87 and 92. The shaft 93, which continuously drives in one direction the switch or control drum, later described, is also driven from the shaft 92 through the intermediary of the gears 94, 95, 96 and 97 on the shafts 98 and 93, as shown in Figs. 5 and 6.

The chuck for holding the couplings comprises the pair of jaws 7 and 8 mounted for sliding radial movement in the chuck frame which consists of the plates 99 and 100, bolted together and provided with the hubs 101, 101 journaled in the bearing 102, 102. The jaws 7 and 8 have threaded therethrough the screw shafts 103, 103 with the bevel gears 104, 104 keyed to their outer ends, the rotation of the screw shafts serving to move the jaws in and out. Bolted to the plate 99 is the spur gear 105 which is driven from the motor 10 through reduction gearing as indicated in Fig. 2. The countershaft 26 driven from the motor, as heretofore described, drives the gear 105 through the intermediary of a gear 106 on the shaft 26, a gear 107 meshing with the gear 106 and keyed to a second countershaft 108 and the pinion 109 also carried by the shaft 108 and meshing with the gear 105. The chuck frame is thus rotated positively from the motor and is reversed in its direction of rotation when the motor is reversed, such reversal coming into play, as heretofore pointed out, only when the tap carried by the turret 4 is moved to the right into operative position. Mounted on the hub 101 of the plate 100 is the annular plate 110 having at one edge the bevel gear 111 meshing with the gears 104, 104. To the right of the plate 100 is mounted an annular plate 112. Lying in an annular recess formed between the shoulder 113 of the plate 112 and the flange 110a on the plate 110 are the series of friction rings 114, 114, etc., one-half of which are held against rotation with respect to the plate 112, and the other half being held against rotation with respect to the plate 110. Keys are employed to hold the rings against rotative movement, this form of friction clutch being well-known, and the desired amount of pressure between the rings is secured by the annular member 115 pressed yieldingly to the left against the outer ring by the springs 116 surrounding a series of adjustable stud bolts 117 screwed into the plate 110.

The plate 112 is provided with a series of four stop lugs 118, 118 (Fig. 16) adapted to be engaged by the plunger 119, moved down by the solenoid 120 (Fig. 2) when the coil thereof is energized, this being accomplished through the lever 121 pivoted to the plunger. A spring 122 serves to withdraw the plunger when the circuit through the solenoid winding is interrupted. When the rotation of the plate 112 is stopped by the plunger, the plate 110 is held frictionally against rotation, so that the rotation of the chuck frame carrying bevel gears 104 past the gear 111 causes such gears 104 to be rotated, thus opening or closing the chuck jaws, depending on the direction of rotation of the chuck frame. The withdrawal of the plunger 118 releases the plate 112, so that it turns with the chuck frame, at which time the rotation of the gears 104 stop, and the chuck jaws are maintained in either open or closed position until the plates 112 and 110 are again prevented from rotating.

In order to prevent the chuck jaws from being separated too far or from being moved inward too far, the yoke 123 (Figs. 14 and 15) is secured to the plate 100 with its fingers 124 straddling a lug 125 projecting from the periphery of the plate 110. The fingers 124 are spaced so that the movement of the chuck frame 99, 100 with respect to the plate is about 15 inches, after which one of the fingers 124 engages the lug 125, and the frame and plate no longer move relatively and the movement of the chuck jaws is stopped.

Figure 17:
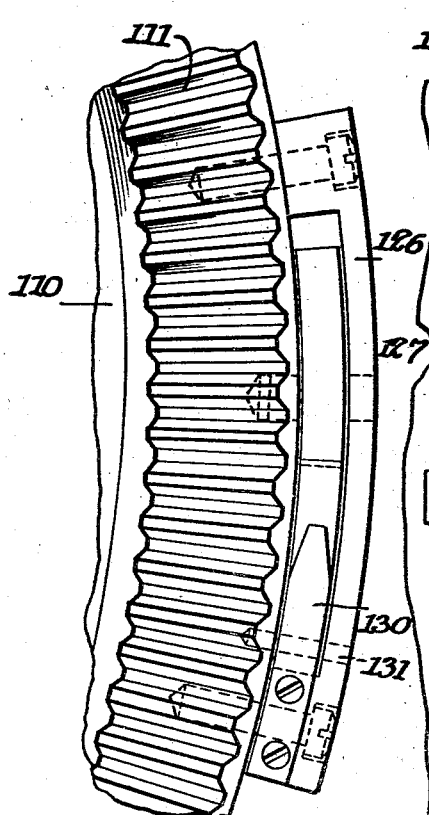
Figure 18:
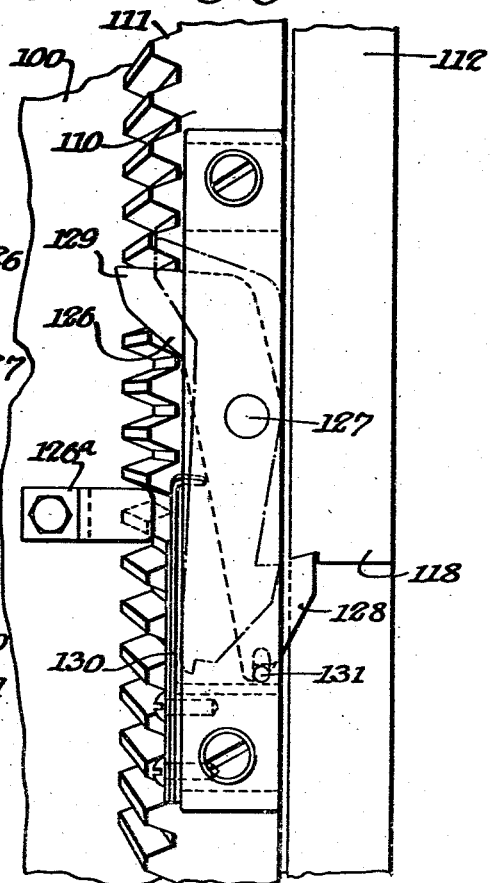
Figure 15:
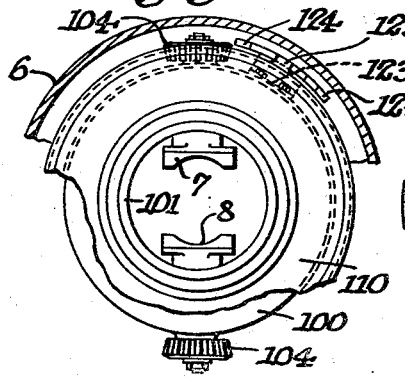
Figure 16:
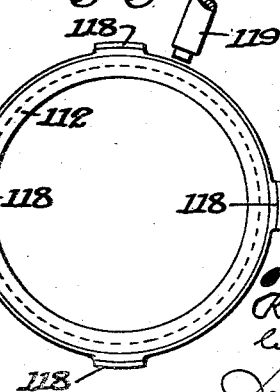

Chuck jaws have a tendency to stick in clamping, or closed position, and the friction clutch 114 will sometimes continue slipping, without starting the jaws to open. To insure the positive opening of the jaws at this time, the device shown in Figs. 17 and 18 is provided. This comprises the latch 126 pivoted to the periphery of the plate 110 at 127 and having a hook end 128 adapted to engage one of the recesses in the lugs 118. When this occurs, the plate 110 must rotate relative to the chuck frame 99, 100, so that the gears 104, 104 are rotated, thus releasing the jaws from the coupling. After a limited period of engagement, the latch is released by the cam member 126a on the plate 100 which engages the end 129 and cams it inward. A flat spring 130 normally presses the latch into the position shown, its movement being limited by the stop pin 131. The cam member 126a is similar in mounting to the member 122 and is similarly connected to the periphery of the plate 100, but is located at about 180 degrees from the member 123 and is arranged to unlock the latch 126 from the lug 118 before one of the fingers 124 (Fig. 15) engages the lug 125.

The sides of the chuck casing are provided with the guide flanges or collars 132, 132 (Fig. 1), which are accurately centered with the axis of rotation of the chuck and with the center lines of the tool arms carried by the turrets. Each tool arm has a collar 133 which fits quite closely into the collars 132, 132. These devices serve to steady the arms at points relatively close to the application of cutting resistance between the tools and couplings 9, and as a result, the operation is made smooth and free from vibration, and the cutting more accurate. The sides of the chuck frame (Figs. 1 and 2) also carry the bars 134, 134 which act as the handles of the four-way valves 135, 135 carried by the tops of the turrets. These valves control the supply of oil pumped through the pipes 136 past the valves to the pipes 137, 137 leading down and connecting with pipes which lead longitudinally of the tool arms 12, 13, 14, 16, 17 and 18 and discharge through outlets at the ends thereof, oil thus being supplied to the interior of the coupling 9 through the arms whose tools are being used. The supply through the other arms at such times is cut off by the valves 135, 135. In order to provide for the movement of the carriages 2 and 3 longitudinally of the frame 1, the rods 134, 134 extend slidably through sleeves 138, 138 carried by the handles of the valves. The oil is collected in a suitable drainage cavity in the machine frame and returned to the suction side of the pump (not shown), which supplies the pipes 136, 136.

The tool equipment of the particular construction illustrated comprises the reamer blades 137 (Fig. 1) carried by the arms 12 and 16, the tap cutters or dies 138ᵃ carried by the tap arms 13 and 18, and the arms 11 and 15 for applying and removing the couplings, as heretofore explained, but other or additional tool equipment may be applied depending on requirements. The tap cutters 138ᵃ are mounted for radial movement, and suitable means are provided for retracting or collapsing them when the threads are cut so as to clear such threads on the backward movements of the carriages, and for causing them to expand again to cutting position during the further backward movement of the carriages, so that they will be ready to cut on the next forward movements of the carriages. The particular means for accomplishing this automatic expansion and contraction of the tap cutters constitute no part of the present invention, however, and for that reason are not illustrated. The construction and relation of the arms 11 and 15 for supplying and removing the couplings will be seen by reference to Fig. 13, which shows the finished coupling 9 about to be pushed out of the chuck and onto the arm 15 by the oncoming blank 9a carried in the sleeve 139. The sleeve is slidably mounted on the arm 11 backed up by the spring 140, so that after the end of the sleeve engages the sides of the chuck jaws 7, 8 the blank 9a can still be advanced by the arm 11 sliding through the sleeve. The coupling 9 is thus pushed onto the arm 15, after which the turret carriages 2 and 3 are retracted, and the turret 4 finally turned 90 degrees, thus permitting the convenient removal of the coupling 9 from the arm 15.

The control of the movements of the carriages and chuck is accomplished automatically by electrical means including a switch drum. This drum controls the actuation of the solenoid 120 heretofore described in connection with the clutch mechanism. It also controls the speed of the motor and its reversal, as well as the movements of the carriages 3 and 4 back and forth. This latter control is exercised through the intermediary of four solenoids which shift the clutches 75 and 79, each clutch being operated by two solenoids, one of which shifts it from neutral position to one operative position, and the other of which shifts it from neutral position to the other operative position. The clutches are returned to neutral position by yielding means when the solenoid coils are not energized. The two limit switches 150 and 151 are also used in conjunction with the switch drum. One of these controls the forward limit of movement of the carriages at fast speed preliminary to the cutting operation, and the other controls their rearward limit of movement at fast speed. These limit switches could be dispensed with and their functions performed by the contact strips of the switch drum, but this would not give the same closeness in regulation, as later explained, due to short distances traveled by the drum as compared with those traveled by the carriages.

The two solenoids 141 and 142, which operate the clutch 75 (Figs. 4 and 5), above referred to, for reversing the direction of movement of the carriages 2 and 3, are mounted on the rear side of the gear box 60 (Fig. 4), their plungers being connected to the two ends of the crank 143 secured to the cross shaft 144. This shaft 144 carries the yoke 145 (Figs. 5 and 6) which engages the clutch 75. When neither solenoid is energized, the clutch 75 assumes the neutral position shown due to suitable counterbalancing of the solenoid bars. This clutch connection gives the high speed forward and back movements of the carriages preliminary to the relatively slower feed movements of the carriages after the tools engage the work, and after such work has been done and the carriages are retracted in order to rotate them ninety degrees and index them.

The other two solenoids 145 and 146, which operate the clutch 79 (Figs. 5 and 6), heretofore referred to, for giving the carriages 2 and 3 their two forward tool feed movements after the tools are in engagement with the work, are mounted on the front side of the gear box (Figs. 1 and 5), their plungers being connected to the two ends of the crank 147 secured to the cross shaft 148. This shaft carries the yoke 149 which engages the clutch 79. When neither solenoid is energized, the clutch 79 assumes the neutral position shown, due to suitable counterbalancing of the solenoid bars. This clutch connection gives the two forward feed speeds of the carriages, one being used when the reamers are cutting, and the other being used when the taps are cutting. The clutch 79, of course, occupies its neutral position when the clutch 75 is in one of its operative positions, and the clutch 75 is in neutral position when the clutch 79 is in one of its operative positions, suitable interlocks being provided between the relays which control them, as later referred to.

A pair of limit switches 150 and 151 (Fig. 1) are mounted on the frame 1 and operated by the carriage 3 to cause the shifting of the clutch 75 from its operative positions to neutral position after the carriages have moved forward the proper distance at high speed and preliminary to throwing in the forward tool feed, and after the carriages have reached the proper position on their rearward movement. Each switch, when operated, breaks the circuits through one of the solenoids 141 or 142 as the case may be, permitting the clutch 75 to move to neutral position. The stop 152 on the carriage operates the switch 150 when the carriage reaches its rearward extreme of movement. Each face of the turret is provided with an adjustable stop 153 adapted to engage and operate the switch 151 when the carriage reaches that point in its forward movement where the high speed movement preliminary to cutting should cease, to be succeeded by one of the relatively slow forward feed movements as secured by the actuation of the clutch 79, after the clutch 75 is moved to neutral position.

The switch drum 171 which controls the operation of the five solenoids, the speed of the electric motor 10 and the reversal of such motor (in order to reverse the direction of rotation of the chuck), is shown in Figs. 4, 19, 20 and 21 in connection with Fig. 23 which shows the wiring diagram and Fig. 22 which shows diagrammatically the drum in expanded developed position. The drum is located on the rear side of the machine, adjacent the gear box 60, and is mounted for rotation on the shaft 154. It is driven from the shaft 93 (Figs. 6 and 20) through the intermediary of the pinion 155 on the shaft 93 and the gear 156 on the shaft 154. The gear 156 is clamped to the end plate 157 of the drum 171 by screwing in the wheel 158 threaded on the end of the shaft 154. The drum may be adjusted relative to the gear 156 by loosening the wheel 158. The drum is grooved circumferentially, as indicated in Figs. 4 and 21, and in the grooves are mounted pairs of overlapping contact strips *a a, b b, c c,* etc. secured in position by the clamping screws 161. This provides a convenient means for adjusting each contact member (consisting of the two strips) as to length. The drum is provided with ten grooves carrying contact members adapted to be engaged by ten contact fingers A, B, C, D, E, F, G, H, I and J carried by the bars 162 and 163, the bar 162 carrying all of the fingers except the finger A which is carried by the bar 163. The fingers and the contact members with which they cooperate and the character of the control afforded thereby are indicated in the following table when read in connection with Fig. 22.

| Finger | Controls | Engages |
|---|---|---|
| A | Safety | Contact member—*a*. |
| B | First speed of motor forward | Contact members—*b—b'* and *b²*. |
| C | Second speed of motor forward | Contact members—*c* and *c'*. |
| D | First speed of motor reverse | Contact members—*d* and *d'*. |
| E | Second speed of motor reverse | Contact member—*e*. |
| F | Clutch 75 fast carriage feed forward | Contact members—*f, f'* and *f²*. |
| G | Clutch 75 fast carriage movement back | Contact members—*g, g', g²* and *g³*. |
| H | Clutch 79 first tool feed forward | Contact member—*h*. |
| I | Clutch 79 second tool feed forward | Contact members *i* and *i'*. |
| J | Solenoid 120 chuck opening and closing | Contact members *j* and *j'*. |

The safety finger A and its contact *a* are continuously engaging when the operations are in proper step, but in case of accident to the parts due to the parts getting out of proper timed relation or the carriage stopping, the finger A will run off of the contact *a*, thus breaking a relay circuit, which controls the motor and the motor will stop. The means whereby the finger A is made to follow or duplicate the back and forth movements of the carriage on a reduced scale will be seen by reference to Figs. 4, 19 and 20, the dotted line X on the contact *a* of the drum (Fig. 22) indicating the line of contact of the finger during one revolution of the drum. Mounted on the side of the carriage 3 is a rack 164 (Fig. 4) engaged by a gear 165 on a shaft 166 journaled in a bracket 167 carried by the frame 1 of the machine. The outer end of the shaft 166 carries a pinion 168. The pinion 168 meshes with a rack on the lower side of the bar 163 mounted for sliding endwise movement in the guide 169 (Fig. 19) carried by the casing 170, which surrounds the drum. The gears 165 and 168 are proportioned so that in normal operation the finger A will be moved longitudinally the distance *y* (Fig. 22), while the carriages are making their full forward or backward strokes and such finger will, therefore, remain upon the contact *a*, and the side extensions *a', a²*, and *a³* of such contact *a*. If the carriage travel should carry the finger A off of the contact *a* or its side extensions at any time, a relay is operated, as hereafter explained, and the supply current to the motor 10, which drives the machine is interrupted.

The drum, as shown in developed form in Fig. 23 makes one revolution for the complete cycle of the machine. Such complete cycle comprises four back and forth movements of the carriages 2 and 3 upon which the turrets are mounted, the section marked K controlling the movement back and forth in the reaming step, the section marked L controlling the movement back and forth as the tap on the turret 5 threads the right hand end (Fig. 1) of the coupling, the section M controlling the movement back and forth as the tap on the turret 4 threads the left hand end of the coupling and the section N controlling the movements of the carriage during the operation of putting on a new coupling and removing the finished one.

The operation and control of the movements of the machine will be understood by a reference to Fig. 22 in connection with the wiring diagram of Fig. 23.

Assuming that a coupling 9 has been placed in the clutch jaws 7, 8 and that the carriages 2 and 3 are in their rearmost positions and the turrets are indexed with their reaming tools in alinement with the coupling, the operation is as follows: To start the motor 10 of the machine, the button 172 is pushed inward closing the button 173, and the "start" button 174 is also closed. This supplies current from the positive lead 175 through the coil of the relay 176 to the negative lead via the wire 178, button 173, the start button 174, wire 179 and wire 180. This causes the relay 176 to close, so that current is supplied from the lead 175 to the safety contact *a* on the drum 171 via the wire 178, button 173, wire 178, wire 181, wire 182 and contact finger A. This supplies current to all of the contact members on the drum; and current is now supplied from the contact member *b* to the wire 183 (through the contact finger B). This current flows through the coil of the relay 184 to the negative lead 177, thus closing such relay and completing the circuit 185, 186 through the motor 10. The motor thus starts forward at its first speed. This immediately brings the strip *f* into engagement with its finger F, so that current is supplied through the wire 187, past the limit switch 151, and through the coil of the relay 188 to the negative lead 177. This causes the relay to close, so that current is supplied through the coil of the solenoid 141 from the positive lead 175 via the wires 189 and 190, thus closing the clutch 75, and giving the fast forward movement of the carriages to bring the reamers to cutting position. This clutch continues in engagement until the limit switch 151 is opened by one of the stop members 153 on the turret 3, thus interrupting the circuit through the coil of the relay 188. This relay then opens interrupting the circuit through the solenoid 141, so that the clutch 75 moves to open (neutral) position. Immediately following the opening of the clutch 75, the contact strip h engages its finger H, thus completing a circuit through the coil of the relay 191 via the wires 192, 193 and 194. This completes a circuit through the coil of the solenoid 145 via the lead 175 and wires 195 and 196. This closes the clutch 79 and gives the carriage the proper speed for advancing the reamers during their cutting operation. This cutting feed is continued until the end of the cut is approached, at which time a somewhat lower speed is secured by slowing down the motor. At this time the contact strip c engages its finger C, thus putting current through the wire 197 and coil of the relay 198. This closes the relay completing a circuit (not shown), including the wires 199 and 200 by means of which the resistance of the motor is modified to reduce its speed. When the reaming cut is completed, the drum reaches a point where the contact strip g engages its finger G, thus supplying current through the wire 201 to the relay 202, so that such relay closes permitting current from the line 175 to flow through the coil of the solenoid 142 via the wire 293 and 204, thus moving the clutch 75 to operative position to secure the return of the carriage. At the same time, the contact strip c moves from beneath its finger C and the strip b' engages the finger B, so that the relay 198 opens and the relay 184 closes again, thus shifting the motor back from second speed to first speed, which continues while the carriages move back and forth and the stop 152 engages and opens the limit switch 150, so that the circuit through the relay 202 is broken, breaking the circuit through the coil of the solenoid 142 and permitting the clutch 75 to move to neutral position.

This completes the first quarter of the machine cycle, the coupling now being reamed, and the carriages at their original starting positions. The control and operation for the second quarter of the operation, during which the tap carried by the turret 3 functions to thread the coupling, is the same as for the reaming operation except that the contact i comes into play instead of a strip lying in alinement with the strip h, such strip i giving a slower tool feed for the tap than is used for the reamers. When this strip engages the finger I, current is supplied through the wire 205 to the coil of the relay 206, thus closing the relay and causing a flow of current from the line 175 through the coil of the solenoid 146, so that the clutch 79 is closed. This gives the lower tapping speed required, the operation from this point until the carriages again index and reach their starting points being as heretofore described in connection of the first quarter of the operation except that the direction of rotation of the motor is reversed as soon as the threading tool is released from the work. This reversal is in anticipation of the reverse rotation required in the chuck during the threading of the other end of the coupling by the tap carried by the turret 4. This reversal occurs when the contact strip d engages the finger D, thus supplying current to the wire 207. This wire leads through the coil of the relay 208, so that such relay is closed, thus completing a circuit (not shown), but including the wire 209 and 210, whereby the circuit through the motor field is reversed, thus causing the motor to reverse its direction of rotation.

The third quarter of the operation is the same as the second except that the motor is running in the reverse direction, thus rotating the chuck reversely as the tap on the turret 4 approaches the coupling and cuts the thread, thus finishing the machining of the coupling, so that all that remains to complete the entire cycle is to remove the finished coupling, replace it by an unfinished one, and get the parts back to starting position.

After the drum reaches the extreme end of the section M of the drum and before the carriage moves forward for the fourth time, the contact strip j engages its finger J, thus supplying current through the wire 211, energizing the coil of the relay 212 which closes, so that current from the line 175 flows through the coil of the solenoid 120. As heretofore explained, this moves the plunger 119 (Fig. 14) so that it stops the rotation of the chuck plate 110 and the chuck jaws are retracted releasing the coupling. The direction of rotation of the motor is now reversed due to the contact finger D passing off of the strip d'; the finger B at such time being in engagement with the strip $b^2$, so that current flows through the wire 183 (Fig. 23) energizing the relay 184 and securing the forward rotation of the motor again. The finger F now engages the strip $f^3$ and current flows through the wire 187 causing the closure of the clutch 75 to give the fast forward movement of the carriages until the arm 11 carrying a new blank to be machined pushes the finished coupling out of the chuck and onto the receiving arm 15 of the turret 4, the new blank being thus positioned between the chuck jaws. At this moment, the finger J engages the contact j' causing the actuation of the solenoid 120 again, so that its plunger 119 engages and stops the rotation of the chuck plate 110. The motor and chuck are now rotating reversely, so that the stopping of the plate 110 causes the chuck jaws to move in and grip the coupling blank. The further movement of the drum brings the contact strip $g^3$ into engagement with the finger G, so that current flows through the wire 201 securing the energizing of the solenoid 142 so that the clutch 75 is shifted to reverse position, and the carriages move back rapidly until the limit switch 150 is actuated by the stop 152 (Fig. 1) to break the circuit and stop the movement to the carriages to the rear. This brings the drum and the carriages back to starting position and the cycle is complete.

In those cases in which contact strips on different grooves overlap, as is the case with the strips $d'$ and $b^2$, the usual interlock is provided between the relays, so that the one does not close until the other opens; e. g., the relay operated by the strip $b^2$ does not close until the relay operated by $d'$ closes. The use of the limit switch 150, which breaks the circuit through the solenoid 14 causing the clutch 75 to release and stop the backward movement of the carriages insures that the drum and carriages shall be in proper relation at the end and beginning of each quarter cycle. The use of the two limit switches to stop the fast back and forth movements of the carriages insures that these movements shall be stopped at more exact and definite positions than if the contact strips were relied on, as the movement of the drum as compared with those of the carriage when the carriage is moving at high speed is very small, so that any error as produced at the cut off by the drum contacts is greatly magnified. This is important, since the point at which the high speed movements of the carriage stop govern the points at which the low speed feed movements begin and these slow speed movements, which are of small range and govern the machining of the blanks, must be accurately gauged and controlled.

The motor may be stopped by pushing in the button 172 to the position shown in Fig. 23. When this button cutting off the flow of current to the drum 171 is closed, current is supplied to the wire 213. Under these conditions, the various relays and solenoids may be controlled by the push buttons 214 to 221. This manual control is a convenience in making adjustments, and in bringing the parts to any desired position without going through the cycle when the switch drum is used.

What I claim is:

1. In combination in a metal working machine, a chuck for holding a coupling and mounted for rotation, a turret provided with indexing means, a cutting tool carried thereby and arranged so that when the turret is indexed its axis is in alinement with the axis of rotation of the chuck, means for moving the turret to cause the tool to advance into the coupling, a carrier for the tool having a guide surface to the rear of the tool concentric therewith, fixed guide means intermediate the chuck and the turret for engaging said guide surface when the tool is advanced to operative position, and means for rotating the chuck.

2. In combination in a metal working machine, a chuck for holding the coupling and mounted for rotation, a turret provided with indexing means, a cutting tool carried thereby and arranged so that when the turret is indexed its axis is in alinement with the axis of rotation of the chuck, means for moving the turret to cause the tool to advance into the coupling, a carrier for the tool having a circular guide surface to the rear of the tool and concentric therewith, a fixed guide sleeve intermediate the chuck and the turret for engaging said guide surface when the tool is advanced to operative position, and means for rotating the chuck.

3. In combination in a machine tool, a chuck and a tool carrier mounted for relative rotary movement and for a movement of approach and retreat, an electric motor connected so as to give said relative rotary movement and movement of approach and retreat, and means for automatically governing said movements comprising control circuits with limit switches governed by the said movements of approach and retreat, a rotatable switch driven from said motor, and electro-magnetic operating devices governed by the limit switches and the rotatable switch.

4. In combination in a machine tool, a chuck and a tool carrier mounted for relative rotary movement and for a movement of approach and retreat, an electric motor connected so as to give said relative rotary movement and movement of approach and retreat, means for automatically governing said movements comprising control circuits, electro-magnetic power devices, and a rotatable switch in said circuits driven from the motor, and a safety device for securing the stoppage of the motor when the rotatable switch and carriage deviate from their proper relative timing and positions comprising a continuous contact strip on the rotatable switch and a contact finger coacting therewith and lying in a control circuit whose interruption due to the finger leaving the strip causes the stoppage of the motor, such finger being mounted so as to follow said movements of approach and retreat in fixed relation thereto.

5. In combination in a machine tool, a chuck and a tool carrier mounted for relative rotary movement and for a movement of approach and retreat, an electric motor connected so as to give said relative rotary movement and movement of approach and retreat, and means for automatically governing said movements, comprising a control circuit, a rotatable switch in said circuit and means for bringing the rotatable switch and the part having the movement of approach and retreat to the same relative position at a predetermined point in the cycle of operations.

6. In combination in a machine tool, a chuck and a tool carrier mounted for relative rotary movement and for a movement of approach and retreat, an electric motor connected so as to give said relative rotary movement and movement of approach and retreat, and means for automatically governing said movement, comprising a control circuit, a rotatable switch in said circuit and means for bringing the rotatable switch and the part having the movement of approach and retreat to the same relative position at a predetermined point in the cycle of operations, said means including a limit switch in said circuit operated by said movement of approach or retreat.

7. In combination in a machine tool, a chuck and a tool carrier mounted for relative rotary movement and for a movement of approach and retreat, an electric motor connected so as to give said relative rotary movement and movement of approach and retreat, and means for automatically governing said movement, comprising a control circuit, a rotatable switch in said circuit and means for bringing the drum and the part having the movement of approach and retreat to the same relative position at a predetermined point in the cycle of operations, said means including a limit switch in said circuit operated by said movement of approach or retreat and a clutch in the driving connections from the motor and controlled by the switch whereby the movement of approach or retreat is stopped until the rotatable switch reaches a predetermined point in its movement of rotation.

8. In combination in a machine tool having a carriage mounted for back and forth movement, a motor, driving connections between the motor and carriage including a reversing clutch, electrical power means for throwing the clutch, a rotatable switch rotated in timed relation with the movement of the carriage, contact means operated by the movement of the rotatable switch for securing the actuation of said power means at timed intervals to throw said clutch first to one of its operative positions and then to the other, and a pair of limit switches, one of which is operated by the movement of the carriage in one direction and the other of which is operated by the movement of the carriage in the reverse direction, such switches being arranged so as to interrupt the circuits to the electrical power means holding the clutches in operative positions, so that said power means permit the clutch to move to neutral position.

9. In combination in a machine tool having a carriage mounted for back and forth movement, a motor, driving connections between the motor and carriage including a reversing clutch, electrical power means for throwing the clutch, means for moving the clutch to neutral position when not acted upon by said power means, a rotatable switch rotated in timed relation with the movement of the carriage, contact means operated by the movement of the rotatable switch for securing the actuation of said power means at timed intervals to throw said clutch first to one of said operative positions and then to the other, and a limit switch operated by the movement of the carriage for interrupting the circuit energizing said electrical power means which holds the clutch in one of said operative positions, so that said means permits said clutch to move to neutral position.

10. In combination in a machine tool having a carriage mounted for back and forth movement, a motor, driving connections between the motor and carriage including a reversing clutch, electrical power means for throwing the clutch, means for moving the clutch to neutral position when not acted upon by said power means, a rotatable switch rotated in timed relation with the movement of the carriage, contact means operated by the movement of the rotatable switch for securing the actuation of said power means at timed intervals to throw said clutch first to one of said operative positions and then to the other, and a pair of limit switches, one of which is operated by the movement of the carriage in one direction and the other of which is operated by the movement of the carriage in the reverse direction, such switches being arranged so as to interrupt the circuits to the electrical power means holding the clutches in operative positions, so that said power means permit the clutch to move to neutral position.

11. In combination in a machine tool having a rotatable chuck and a carriage mounted for back and forth movement, a motor, driving connections between the motor and the chuck and carriage including a reversing clutch and a change speed clutch, means for moving the clutches to neutral positions, electrical power means for throwing the clutches, a rotatable switch rotated from the motor, and contact means made effective by the movement of the rotatable switch for securing the actuation of said power means at timed intervals to throw said clutches to their operative positions.

12. In combination in a machine tool having a rotatable chuck and a carriage mounted for back and forth movement, a motor, driving connections between the motor and the chuck and carriage including a reversing clutch and a change speed clutch, means for moving the clutches to neutral positions, electrical power means for throwing the clutches, a rotatable switch rotated from the motor, contact means made effective by the movement of the rotatable switch for securing the actuation of said power means at timed intervals to throw said clutches to their operative positions, and other means including contacts made effective by the rotation of the rotatable switch for changing the speed of the motor.

13. In combination in a machine tool having a rotatable chuck and two carriages mounted for back and forth movement with respect to the chuck, a motor, driving connections between the motor and chuck and carriages including a reversing clutch and a change speed clutch, means for moving the clutches to neutral positions, electrical power means for throwing the clutches, a rotatable switch rotated from the motor, contact means made effective by the movement of the rotatable switch for securing the actuation of said power means at timed intervals to throw said clutches to their operative positions, and other means including contacts made effective by the rotation of the rotatable switch for reversing the direction of rotation of the motor and for changing the speed of such motor, the driving connections for the drum and carriage feed being arranged to move continuously in the same direction regardless of the reversal of the motor.

14. In combination in a machine tool having a rotatable chuck and two carriages mounted for back and forth movement with respect to the chuck, a motor, driving connections between the motor and chuck and carriages including a reversing clutch, means for moving the clutch to neutral position, electrical power means for throwing the clutch, a rotatable switch rotated continuously in one direction from the motor, contact means made effective by the movement of the rotatable switch and securing the actuation of said power means at timed intervals to throw said clutch to its operative positions, and other means, including contacts made effective by the rotation of the rotatable switch for reversing the direction of rotation of the motor.

15. In combination in a machine tool having a carriage mounted for back and forth movement, a motor, driving connections between the motor and carriage including a reversing clutch, electrical power means for throwing the clutch, a rotatable switch rotated by the motor, contact means made effective by the movement of the rotatable switch for securing the actuation of said power means at timed intervals to throw said clutch to one of its operative positions, and means operated by the movement of the carriage for securing the actuation of the clutch in such manner that the carriage and rotatable switch are brought to the same relative position at definite fixed intervals.

16. In combination in a machine tool having a carriage mounted for back and forth movement, a motor, driving connections between the motor and carriage including a reversing clutch, electrical power means for throwing the clutch, a rotatable switch rotated by the motor, contact means made effective by the movement of the rotatable switch for securing the actuation of said power means at timed intervals to throw said clutch to one of its operative positions, and means operated by the movement of the carriage for securing the actuation of the clutch in such manner that the carriage and rotatable switch are brought to the same relative position at definite fixed intervals, said means comprising a limit switch lying in the circuit which energizes said electrical power means.

17. In combination in a machine tool having a carriage mounted for back and forth movement, a motor, driving connections between the motor and carriage including a reversing clutch, electrical power means for throwing the clutch, means for moving the clutch to neutral position when not acted upon by said power means, a rotatable switch rotated by the motor, contact means made effective by the movement of the rotatable switch for securing the actuation of said power means at timed intervals to throw said clutch to one of its operative positions, and means operated by the movement of the carriage for securing the actuation of the clutch in such manner that the carriage and rotatable switch are brought to the same relative position at predetermined intervals, said means comprising a limit switch lying in the circuit which energizes said electrical power means.

18. In combination in a machine tool having a carriage mounted for back and forth movement, a motor, driving connections between the motor and carriage including a reversing clutch, electrical power means for throwing the clutch, a rotatable switch rotated by the motor, contact means made effective by the movement of the rotatable switch for securing the actuation of said power means at timed intervals to throw said clutch to one of its operative positions, and means operated by the movement of the carriage for securing the actuation of the clutch in such manner that the carriage and rotatable switch are brought to the same relative position at the end of each return movement of the carriage.

In testimony whereof, I have hereunto subscribed my name this 10th day of May, 1928.

ROBERT L. HIBBARD.